US012652139B2

(12) United States Patent
Chen et al.

(10) Patent No.: US 12,652,139 B2
(45) Date of Patent: Jun. 9, 2026

(54) PRECODING CONFIGURATION AND INDICATION FOR SIMULTANEOUS PUSCH TO MULTIPLE TRPS

(71) Applicant: MEDIATEK INC., Hsinchu (TW)

(72) Inventors: Yi-Ru Chen, Hsinchu (TW);
Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 444 days.

(21) Appl. No.: 18/371,515

(22) Filed: Sep. 22, 2023

(65) Prior Publication Data

US 2024/0121055 A1 Apr. 11, 2024

Related U.S. Application Data

(60) Provisional application No. 63/382,126, filed on Nov. 3, 2022, provisional application No. 63/377,562, filed on Sep. 29, 2022.

(51) Int. Cl.
*H04L 5/00* (2006.01)
*H04W 72/1268* (2023.01)
*H04W 72/232* (2023.01)

(52) U.S. Cl.
CPC ....... *H04L 5/0051* (2013.01); *H04W 72/1268* (2013.01); *H04W 72/232* (2023.01)

(58) Field of Classification Search
CPC ... H04L 5/0051; H04L 5/0091; H04L 5/0023; H04L 5/0053; H04L 5/0046;
(Continued)

(56) References Cited

U.S. PATENT DOCUMENTS

| 12,520,308 B2 * | 1/2026 | Gao ................. H04W 72/1268 |
| 2024/0048327 A1 * | 2/2024 | Khoshnevisan ...... H04W 72/23 |

(Continued)

FOREIGN PATENT DOCUMENTS

| EP | 4096316 A1 | 11/2022 | |
| WO | WO-2021149265 A1 * | 7/2021 | ............. H04L 5/005 |
| WO | WO-2023097542 A1 * | 6/2023 | .......... H04W 72/232 |

OTHER PUBLICATIONS

Panasonic, "UL Precoding for Multi-panel Transmission", 3GPP TSG-RAN WG1 Meeting #112be, R1-2302397, Apr. 17-Apr. 26, 2023 (Year: 2023).*

(Continued)

*Primary Examiner* — Thinh D Tran

(74) *Attorney, Agent, or Firm* — Troutman Pepper Locke LLP; Tim Tingkang Xia, Esq.

(57) ABSTRACT

A UE receives configurations of first and second configured SRS resource sets for non-codebook based transmission. The UE receives DCI containing a first SRI field and a second SRI field. The first SRI field indicates an SRS resource of a first indicated SRS resource set. The second SRI field indicates an SRS resource of a second indicated SRS resource set. A size of the first SRI field is based on a first maximum number of layers, a second maximum number of layers, a third maximum number of layers, a first number of SRS resources in the first indicated SRS resource set, and a second number of SRS resources in the second indicated SRS resource set. A size of the second SRI field is based on the third maximum number of layers and the second number of SRS resources in the second indicated SRS resource set.

18 Claims, 9 Drawing Sheets

(58) Field of Classification Search
CPC ............... H04L 5/0048; H04L 27/2602; H04L 25/0224; H04W 72/1268; H04W 72/232; H04W 72/21; H04B 7/0408; H04B 7/0469; H04B 7/0623; H04B 7/0404; H04B 7/0456
See application file for complete search history.

(56) References Cited

U.S. PATENT DOCUMENTS

| | | | | |
|---|---|---|---|---|
| 2024/0333460 A1* | 10/2024 | Xiao | ...................... | H04L 5/0094 |
| 2025/0141624 A1* | 5/2025 | Chen | ...................... | H04L 5/0051 |
| 2025/0343652 A1* | 11/2025 | Huang | ................ | H04W 72/232 |
| 2025/0357974 A1* | 11/2025 | Sun | ...................... | H04B 7/0486 |

OTHER PUBLICATIONS

MediaTek Inc., "Simultaneous transmission across multiple UE panels", 3GPP TSG RAN WG1 #112bis-e, R1-2303361, Apr. 17-Apr. 26, 2023 (Year: 2023).*
3GPP TSG RAN WG1 #112bis-e, R1-2303361, e-Meeting, Apr. 17th-Apr. 26, 2023.
European Patent Office, May 6, 2024, Germany.
3GPP TSG RAN WG1 #111, R1-2212238, Toulouse, France, Nov. 14-18, 2022.
3GPP TSC RAN WG1 #112, Athens, Greece, Feb. 27th-Mar. 3, 2023.
European Search Report, Feb. 15, 2024, Germany.
European Patent Office, "Search Report", Mar. 7, 2025, Germany.
3GPP TSC RAN WG1 #112, R1-230xxxx, Athens, Greece, Feb. 27th-Mar. 3, 2023, Simultaneous transmission across multiple UE panels.

* cited by examiner

506

504

502

500

PDCCH

DL Data

Common
UL Burst

PDCCH

UL Data

Common
UL Burst

900

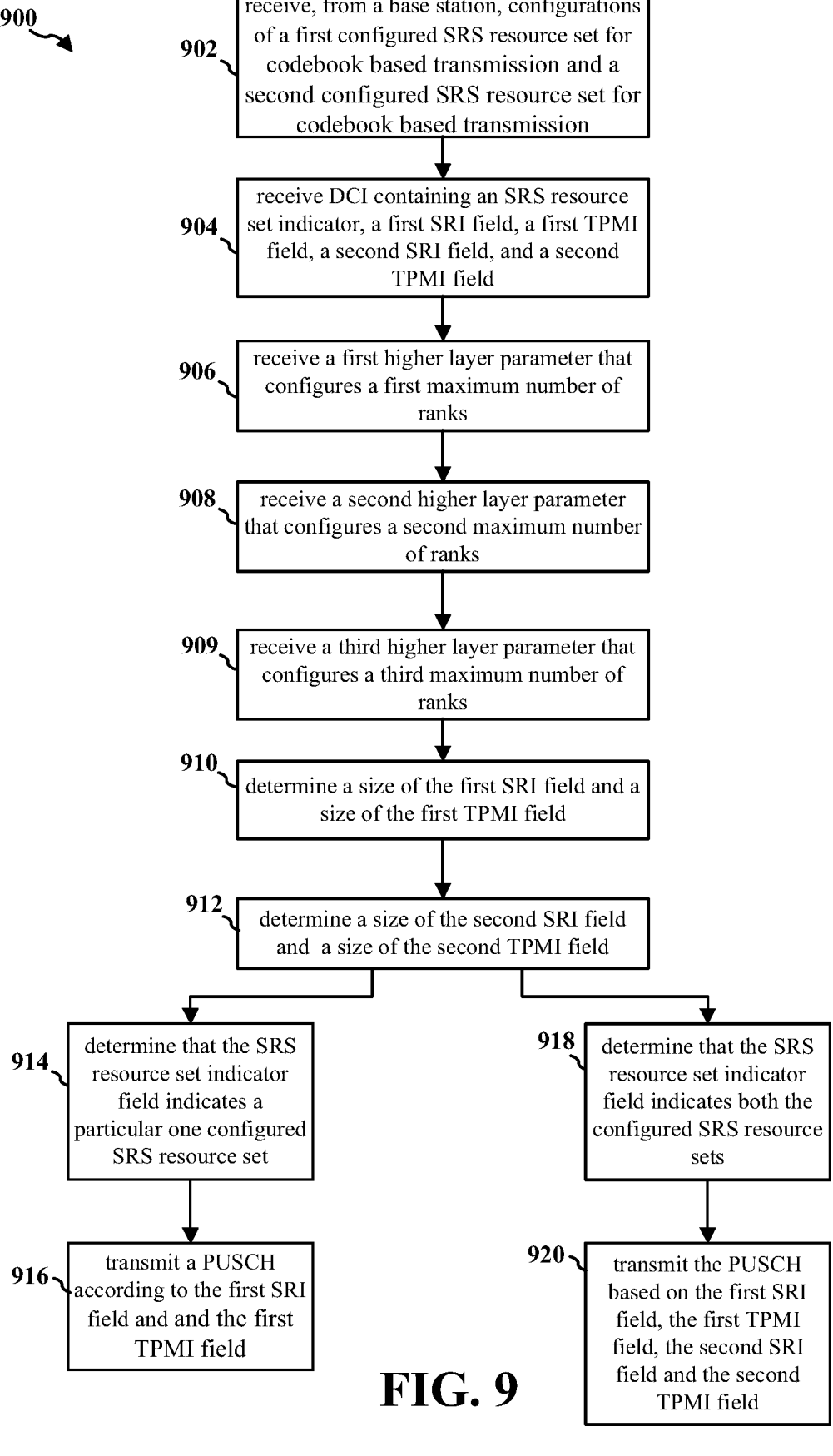

902 — receive, from a base station, configurations of a first configured SRS resource set for codebook based transmission and a second configured SRS resource set for codebook based transmission 904 — receive DCI containing an SRS resource set indicator, a first SRI field, a first TPMI field, a second SRI field, and a second TPMI field 906 — receive a first higher layer parameter that configures a first maximum number of ranks 908 — receive a second higher layer parameter that configures a second maximum number of ranks 909 — receive a third higher layer parameter that configures a third maximum number of ranks 910 — determine a size of the first SRI field and a size of the first TPMI field 912 — determine a size of the second SRI field and a size of the second TPMI field 914 — determine that the SRS resource set indicator field indicates a particular one configured SRS resource set 916 — transmit a PUSCH according to the first SRI field and and the first TPMI field 918 — determine that the SRS resource set indicator field indicates both the configured SRS resource sets 920 — transmit the PUSCH based on the first SRI field, the first TPMI field, the second SRI field and the second TPMI field

FIG. 9

PRECODING CONFIGURATION AND INDICATION FOR SIMULTANEOUS PUSCH TO MULTIPLE TRPS

CROSS-REFERENCE TO RELATED APPLICATION(S)

This application claims the benefits of U.S. Provisional Application Ser. No. 63/377,562, entitled "PRECODING METHOD FOR SIMULTANEOUS PUSCH TO MULTIPLE TRP" and filed on Sep. 29, 2022 and the benefits of U.S. Provisional Application Ser. No. 63/382,126, entitled "PRECODING CONFIGURATION AND INDICATION FOR SIMULTANEOUS PUSCH TO MULTIPLE TRP" and filed on Nov. 3, 2022, both of which are expressly incorporated by reference herein in their entirety.

BACKGROUND

Field

The present disclosure relates generally to communication systems, and more particularly, to techniques of signaling from a base station to a user equipment (UE) for SRS resource indicators (SRIs) and transmission precoding matrix indicator (TPMIs).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives from a base station, configurations of a first configured sounding reference signal (SRS) resource set for non-codebook based transmission and a second configured SRS resource set for non-codebook based transmission. The UE receives downlink control information (DCI) containing a first SRS resource indicator (SRI) field and a second SRI field. The first SRI field indicates an SRS resource of a first indicated SRS resource set. The second SRI field indicates an SRS resource of a second indicated SRS resource set. The UE determines a size of the first SRI field based on a first maximum number of layers, a second maximum number of layers, a third maximum number of layers, a first number of SRS resources in the first indicated SRS resource set, and a second number of SRS resources in the second indicated SRS resource set. The UE determines a size of the second SRI field based on the third maximum number of layers and the second number of SRS resources in the second indicated SRS resource set. The UE transmits the PUSCH based on the first SRI field and the second SRI field according to an SRS resource set indicator field in the received DCI.

In another aspect of the disclosure, a method, a computer-readable medium, and an apparatus are provided. The apparatus may be a UE. The UE receives, from a base station, configurations of a first configured sounding reference signal (SRS) resource set for a physical uplink shared channel (PUSCH) that is codebook based and a second configured SRS resource set for the PUSCH. The UE receives downlink control information (DCI) containing a first SRI field, a first transmission precoding matrix indicator (TPMI) field, a second SRI field, and a second TPMI field. The first SRI field indicates a first SRS resource of a first indicated SRS resource set. The first TPMI field indicates a first precoder associated with the first SRS resource to be used for transmitting the PUSCH. The second SRI field indicates a second SRS resource of a second indicated SRS resource set. The second TPMI field indicates a second precoder associated with the second SRS resource to be used for transmitting the PUSCH. The UE determines a size of the first SRI field based on a first number of configured SRS resources in the first indicated SRS resource set and a second number of configured SRS resources in the second indicated SRS resource set. The UE determines a size of the second SRI field based on the second number of configured SRS resources in the second indicated SRS resource set. The UE determines a size of the first TPMI field based on a first maximum number of layers, a second maximum number of layers, a third maximum number of layers, a first number of configured SRS ports of the first SRS resource and a second number of configured SRS ports of the second SRS resource. The UE determines a size of the second TPMI field based on the third maximum number of layers and the second number of configured SRS ports of the second SRS resource. The UE transmits the PUSCH based on the first SRI field, the first TPMI field, the second SRI field and the second TPMI field according to an SRS resource set indicator field in the received DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flow chart of a method (process) for transmitting a PUSCH that is codebook based.

DETAILED DESCRIPTION

Figure 1:
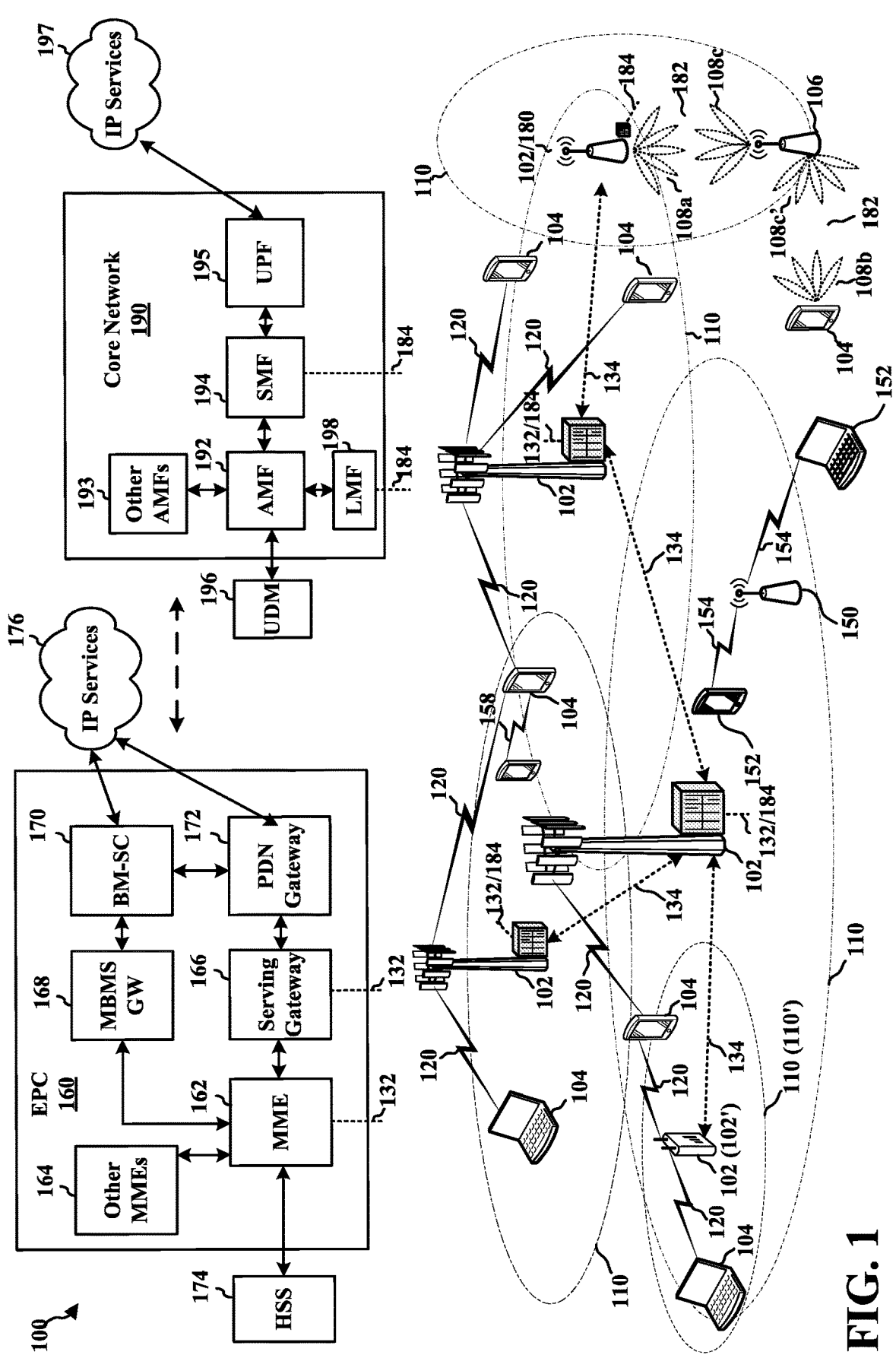
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
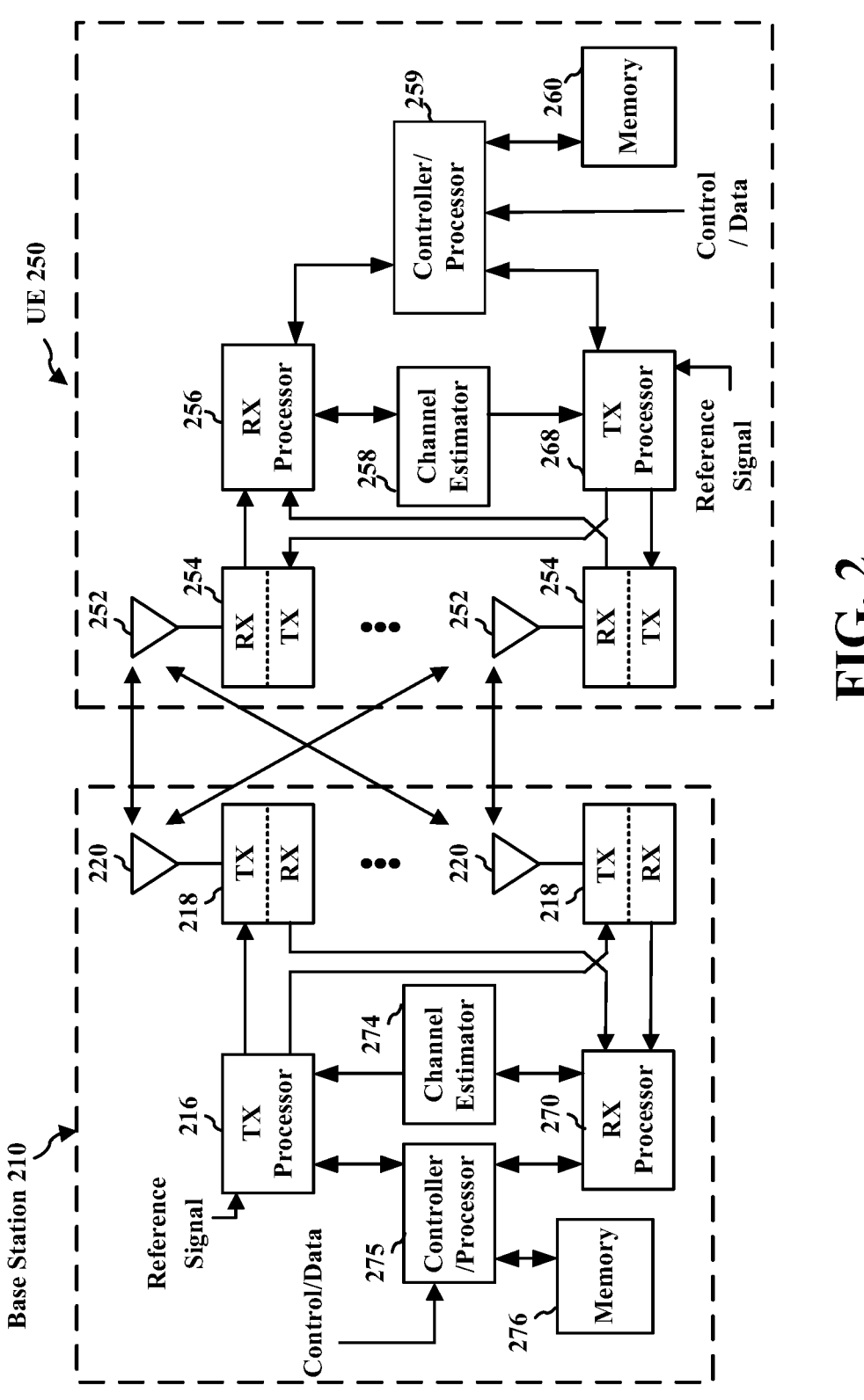
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
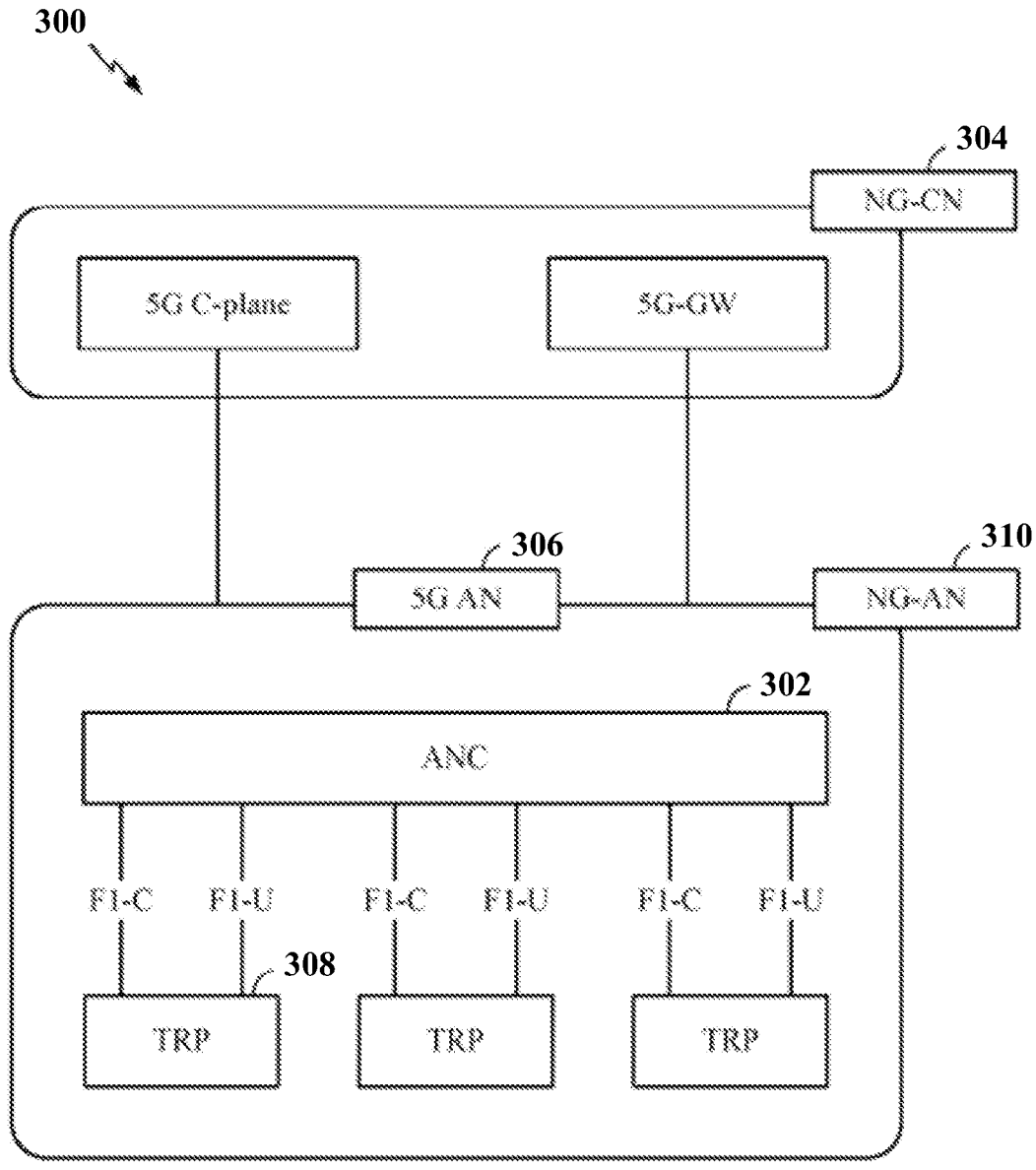
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
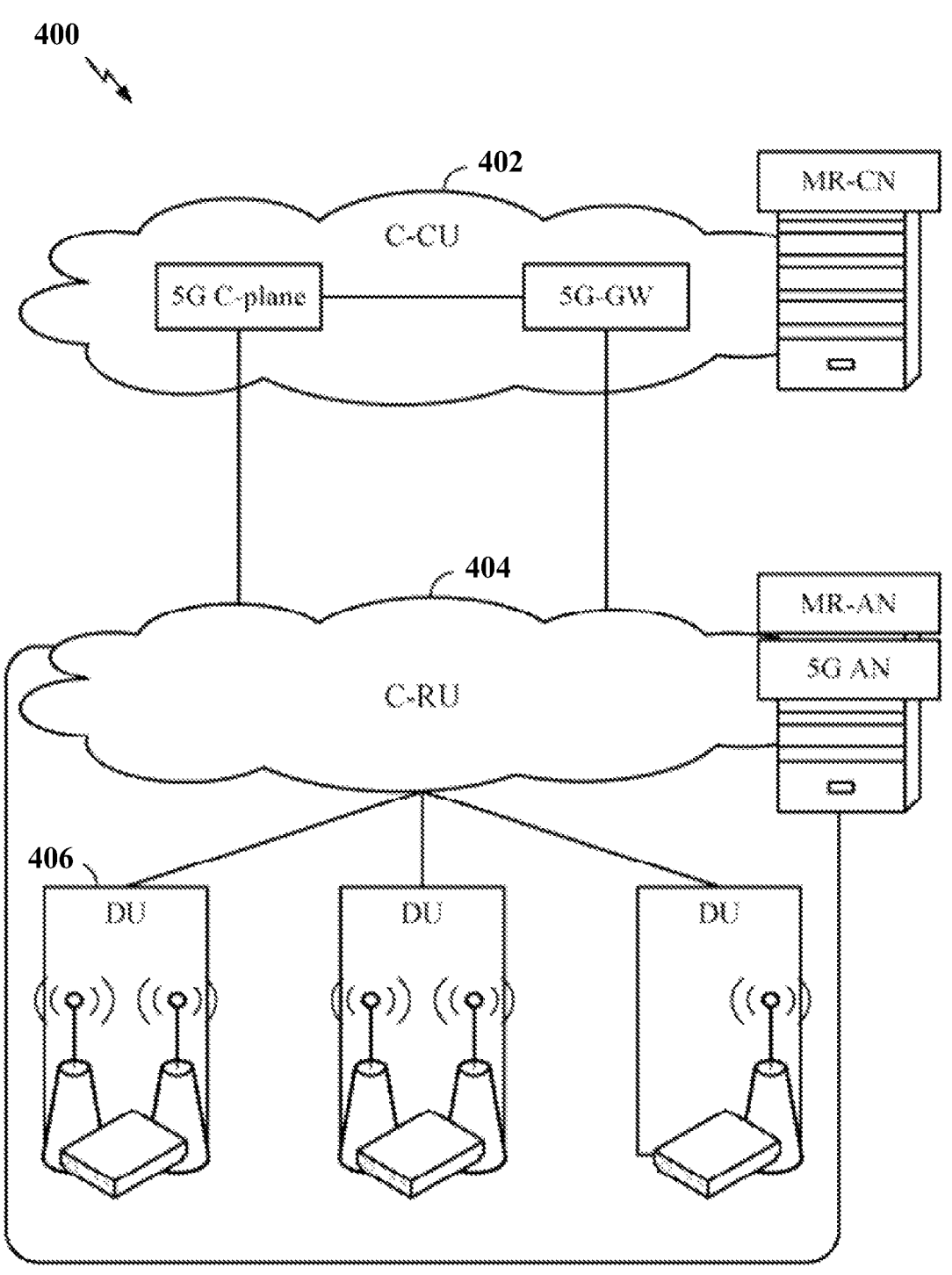
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
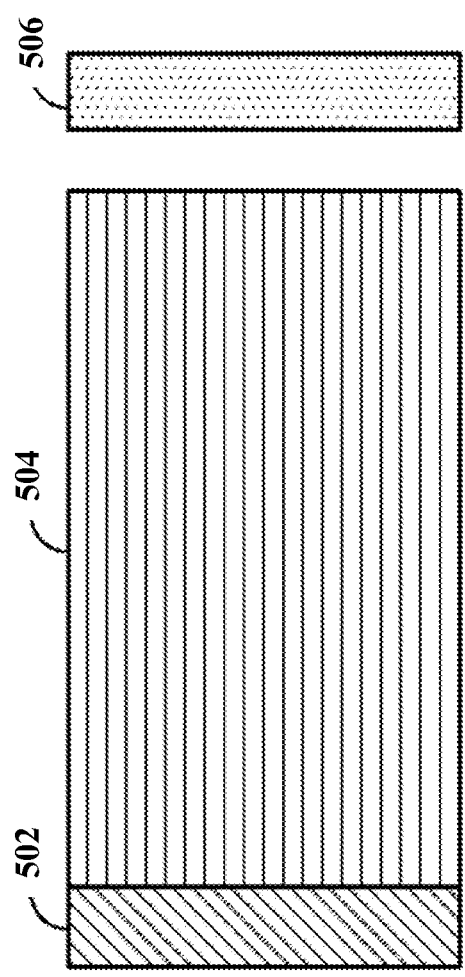
FIG. 5 is a diagram showing an example of a DL-centric slot.
Figure 5:
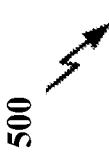
Figure 5:
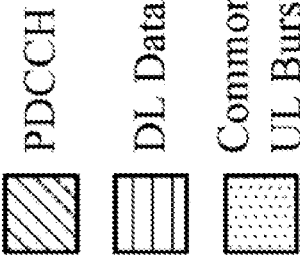

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
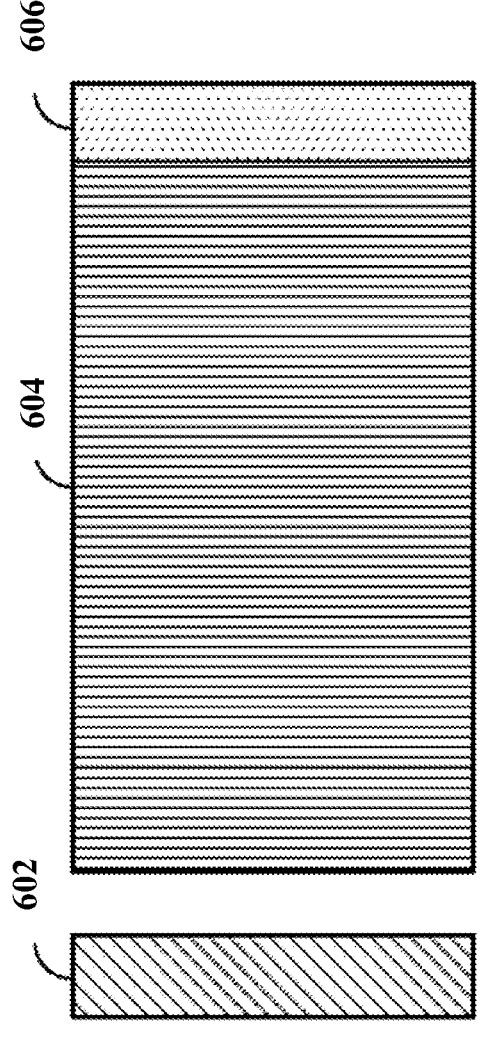
FIG. 6 is a diagram showing an example of an UL-centric slot.
Figure 6:
Figure 6:
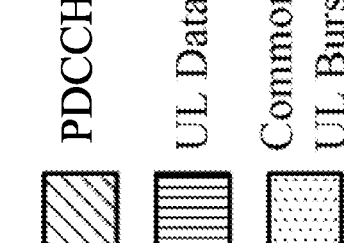

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
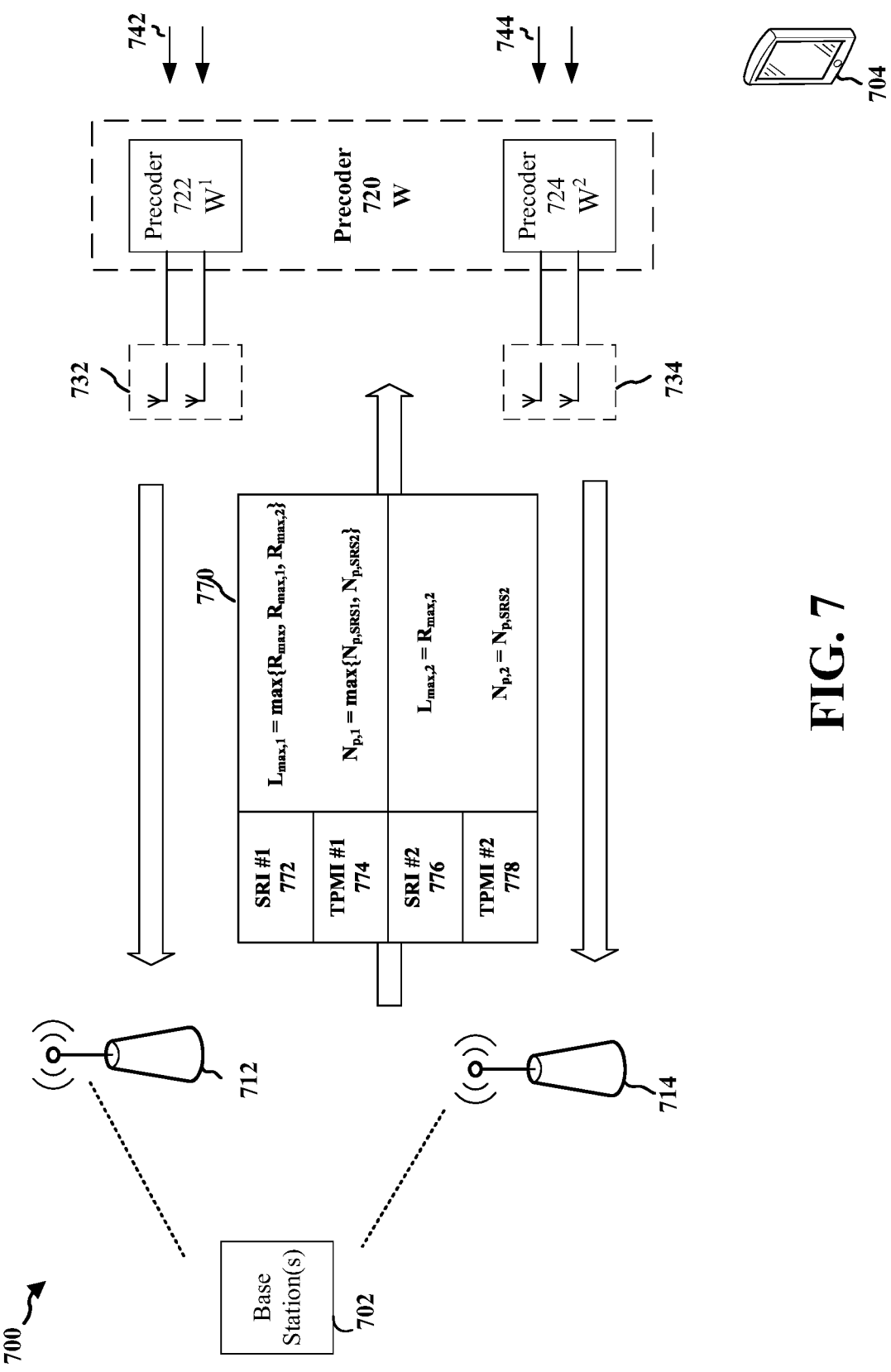
FIG. 7 is a diagram illustrating a diagram 700 illustrating signaling for SRIs and TPMIs.

FIG. 7 is a diagram 700 illustrating signaling for SRS resource set indicator(s) field and transmission precoding matrix indicator field(s). In this example, a UE 704 is equipped with two antenna panels 732 and 734. Each antenna panel has two antenna ports. The UE 704 uses antenna panel 732 to transmit uplink data to a TRP 712 and uses antenna panel 734 to transmit uplink data to a TRP 714. The TRP 712 and the TRP 714 are controlled by one or more base station(s) 702.

The UE 704 uses a precoder 722 to map one or two layers of data 742 to antenna ports of the first antenna panel 732. The UE 704 uses a precoder 724 to map one or two layers of data 744 to antenna ports of the first antenna panel 734. In a SFN scheme, the one or two layers of data 742 and the one or two layers of data 744 are the same. In a SDM scheme, the one or two layers of data 742 and the one or two layers of data 744 are different.

In this example, for both codebook-based and non-codebook-based transmission, the base station 702 may configure two SRS resource sets (e.g., a first SRS resource set and a second SRS resource set) for the UE 704 for CSI acquisition: the first SRS resource set for transmission associated with the TRP 712, and the second SRS resource set for transmission associated with the TRP 714. The first and the second SRS resource sets which are for non-codebook based transmission have the same number of configured SRS resource(s) in the SRS resource set, and the first and the second SRS resource sets which are for codebook based transmission have the same number of configured SRS port(s) of an SRS resource(s) in the SRS resource set.

For a PUSCH transmission in single-DCI based multi-TRP operation, if the PUSCH is scheduled by a Type-1 configured grant, one or two SRI fields and one or two TPMI fields is provided by the higher layer configuration. If the PUSCH is scheduled by a dynamic grant or activated by a Type-2 configured grant, one or two SRI fields, one or two TPMI field and one SRS resource set indicator field is provided in the DCI scheduling or activating the PUSCH.

In this example, the base station 702 transmits DCI 770 to the UE 704. For codebook based PUSCH transmissions, the DCI 770 contains one SRS resource set indicator field, the first SRI field, the second SRI field, the first TPMI field and the second TPMI field. The TPMI fields indicates the precoding matrix/vectors to be applied on the antenna ports. The SRI fields indicate which SRS resources are associated with the TPMI fields for determining precoders for PUSCH transmission. For non-codebook based PUSCH transmissions, the DCI 770 contains one SRS resource set indicator, the first SRI field and the second SRI field. The SRI fields indicate which SRS resources are used for deriving precoders for PUSCH transmission.

The SRS resource set indicator field indicates how the two configured SRS resources sets at the UE 704 are associated with the SRIs field and the TPMI fields in the DCI 770. In one example, a 2-bit SRS resource set indicator field indicates which SRS resource set(s) are associated with the SRI/TPMI fields. For example, for codebook-based PUSCH transmissions, the codepoint 00 indicates single TRP transmission to TRP 1 using the first configured SRS resource set. In this case, only the first SRI field 772 and first TPMI field 774 are used, associated with the first configured SRS resource set and TRP 1. The second SRI field 776 and the second TPMI field 778 are reserved. The codepoint 01 indicates the second configured SRS resource set corresponding to a single TRP transmission to the TRP 714 and that the first SRI field 772 and the first TPMI field 774 are associated with the TRP 714. The second SRI field 776 and the second TPMI field 778 are reserved. The codepoint 10 indicates the first configured SRS resource set corresponding a multiple TRP transmission to the TRP 712 and the second configured SRS resource set corresponding a multiple TRP transmission to the TRP 714 and that the first SRI field 772 and the first TPMI field 774 are associated with the TRP 712 and the second SRI field 776 and the second TPMI field 778 are associated with the TRP 714. The codepoint 11 is reserved. For codebook-based PUSCH transmissions, the SRI fields are similar to non-codebook-based PUSCH transmissions, and the TPMI fields are omitted.

As such, based on the various indicators contained in the DCI 770, the UE 704 can determine a first precoder used for transmitting PUSCHs to the TRP 712 and a second precoder used for transmitting PUSCHs to the TRP 714. In particular, the same PUSCH can be precoded by the first precoder and transmitted to the TRP 712; the same PUSCH can be precoded by the second precoder and transmitted to the TRP 714.

The UE 704 needs to determine the sizes of the SRI fields and the TPMI fields in order to correctly decode them. For both codebook-based and non-codebook-based PUSCH transmissions, the size of the SRI field 772 is a function of the number of maximum layers $L_{max,1}$ and the number of antenna ports $N_{p,1}$ of the associated SRS resource set which is associated with the TRP 712. The size of SRI field 776 is a function of the number of maximum layers $L_{max,2}$ and the number of antenna ports $N_{p,2}$ of the associated SRS resource set.

For codebook-based PUSCH transmissions, the size of the TPMI field 774 is also a function of the number of maximum layers $L_{max,1}$ and the number of antenna ports $N_{p,1}$ of the associated SRS resource set which is associated with the TRP 712. The TPMI field 778 is also a function of the number of maximum layers $L_{max,2}$ and the number of antenna ports $N_{p,2}$ of the associated SRS resource set which is associated with the TRP 714.

Further, the values of $L_{max,1}$, $N_{p,1}$, $L_{max,2}$ and $N_{p,2}$ are determined according to the parameters $R_{max}$, $R_{max,1}$, $R_{max,2}$) $N_{p,SRS1}$ and $N_{p,SRS2}$, where $R_{max}$ is the number of maximum layers in single TRP transmission, $R_{max,1}$ and $R_{max,2}$ are the maximum layer combination for the two TRPs in multi-TRP transmission, $N_{p,SRS1}$ is the number of SRS ports for the first configured SRS resource set (for codebook-based) or the number of SRS resources for the first configured SRS resource set (for non-codebook-based), and $N_{p,SRS2}$ is the number of SRS ports for the second configured SRS resource set (for codebook-based) or the number of SRS resources for the second configured SRS resource set (for non-codebook-based).

The determination rule for $L_{max,1}$, $N_{p,1}$, $L_{max,2}$ and $N_{p,2}$ is:

$$L_{max,1} = \max\{R_{max}, R_{max,1}, R_{max,2}\}$$

$$N_{p,1} = \max\{N_{p,SRS1}, N_{p,SRS2}\}$$

$$L_{max,2} = R_{max,2}$$

$$N_{p,2} = N_{p,SRS2}$$

Typically, $R_{max,1}$ is equal to $R_{max,2}$, equal to $N_{p,SRS2}$ if full power mode 2 is not configured.

In this example, $R_{max}=4$, representing the maximum number of layers in single TRP transmission. $R_{max,1}= R_{max,2}=2$, representing the maximum number of layers per TRP in multi-TRP transmission. $N_{p,SRS1}=N_{p,SRS2}=2$, representing the number of SRS ports or SRS resources in each SRS resource set.

Further, for non-codebook-based PUSCH transmissions, the length of the SRI field 772 is determined based on the below equation:

$$\left\lceil \log_2\left( \sum_{k=1}^{\min\{L_{max,1}, N_{p,1}\}} \binom{N_{p,1}}{k} \right) \right\rceil.$$

For codebook-based transmission, the length of the SRI field 772 is determined based on the below equation:

$$\lceil \log_2(N_{p,1}) \rceil.$$

Further, for non-codebook-based PUSCH transmissions, the length of the SRI field 776 is determined based on the below equation:

$$\left\lceil \log_2\left( \sum_{k=1}^{\min\{L_{max,2}, N_{p,2}\}} \binom{N_{p,2}}{k} \right) \right\rceil.$$

For codebook-based transmission, the length of the SRI field 772 is determined based on the below equation:

$$\lceil \log_2(N_{p,2}) \rceil.$$

For codebook-based PUSCH transmissions, the UE 704 can determine the size of the first TPMI field 774 based on the maximum number of layers $L_{max,1}$ and the number of antenna ports $N_{p,1}$ used by the first SRS resource set. More specifically, the size of the first TPMI field 774 depends on the following parameters:

$$L_{max,1} = \max\{R_{max}, R_{max,1}, R_{max,2}\}$$

$$N_{p,1} = \max\{N_{p,SRS1}, N_{p,SRS2}\}$$

where:

$R_{max}$ is the maximum number of layers in single TRP transmission, $R_{max,1}$ and $R_{max,2}$ are the maximum number of layers per TRP in multi-TRP transmission, $N_{p,SRS1}$ is the number of antenna ports or SRS resources in the first configured SRS resource set, $N_{p,SRS2}$ is the number of antenna ports or SRS resources in the second configured SRS resource set.

In particular, $R_{max}$ may be referred to as maxRank: maximum layers for single TRP transmission. $R_{max,1}$ may be referred to as maxRankSfn: maximum layers per TRP for multi-TRP SFN transmission or as maxRankSdm: maximum number of layers per TRP for multi-TRP SDM transmission.

Similarly, the UE 704 can determine the size of the second TPMI field 778 based on the maximum number of layers $L_{max,2}$ and the number of antenna ports $N_{p,2}$ used by the second configured SRS resource set.

$$L_{max,2} = R_{max,2}$$

$$N_{p,2} = N_{p,SRS2}$$

where:

$R_{max,2}$ is the maximum number of layers per TRP in multi-TRP transmission, $N_{p,SRS2}$ is the number of antenna ports or SRS resources in the second configured SRS resource set.

In particular, $R_{max,2}$ may be referred to as maxRankSfn: maximum layers per TRP for multi-TRP SFN transmission or as maxRankSdm: maximum number of layers per TRP for multi-TRP SDM transmission.

As such, the size of the TPMI fields depends on the maximum number of layers and antenna ports that need to be indicated for each associated SRS resource set, which further depends on the single and multi-TRP transmission parameters configured by the base station. The mapping between SRS resource sets and TPMI fields is indicated dynamically using the SRS resource set indicator in the DCI.

In certain scenarios, the base station 702 configures the UE 704 to transmit data in accordance with a SFN scheme. As described supra, in a SFN scheme, the one or two layers of data 742 and the one or two layers of data 744 are the same. In this example, In a first example, the UE 704 may generate 2 layers uplink data $y_1$ and $y_2$, which can be represented by a vector:

$$y = \begin{bmatrix} y_1 \\ y_2 \end{bmatrix}.$$

Subsequently, $y_{2 \times 1}$ are used as both the data 742 and the data 744.

As described supra, the UE 704 receives the DCI 770 that includes the TPMI field 774 and the TPMI field 778. The TPMI field 774 indicates the precoder $W_1$ and TPMI field 778 indicates the precoder $W_2$. The UE 704 maps y to the set of antenna ports of the first antenna panel 732 using $W_1$ and maps the same $y_2$ to the set of antenna ports of the second antenna panel 734 using $W_2$.

The combined precoding by the precoder 722 and the precoder 724 can be represented as:

$$\begin{bmatrix} z_1 \\ z_2 \end{bmatrix} = \begin{bmatrix} W_1 & 0 \\ 0 & W_2 \end{bmatrix} \begin{bmatrix} y \\ y \end{bmatrix},$$

where $z_1$ represents a vector of precoded symbols to be transmitted from the antenna ports of the first antenna panel 732, and $z_2$ represents a vector of modulation symbols to be transmitted at the antenna ports of the first antenna panel 734.

In certain scenarios, the base station 702 configures the UE 704 to transmit data in accordance with a SDM scheme. In a SDM scheme, different layers are transmitted to different TRPs simultaneously. As described previously, the UE 704 will receive two indicated precoders $W_1$ and $W_2$ via the TPMI field 774 and the TPMI field 778 in the DCI 770. $W_1$ is intended for transmission to the first TRP 712 and $W_2$ is intended for transmission to the second TRP 714.

The key difference compared to SFN scheme is that the layers mapped to each precoder are different. As shown in the figure, the first precoder 722 maps the layers $y_1$ and $y_2$ to the antenna ports of the first antenna panel 732. The second precoder 724 maps the layers $y_3$ and $y_4$ to the antenna ports of the second antenna panel 734. The layers $y_1$, $y_2$ are distinct from layers $y_3$, $y_4$. This allows the UE 704 to transmit different data to the two TRPs simultaneously, thereby increasing the overall throughput.

Mathematically, the combined precoding can be represented as:

$$\begin{bmatrix} z_1 \\ z_2 \end{bmatrix} = \begin{bmatrix} W_1 & 0 \\ 0 & W_2 \end{bmatrix} \begin{bmatrix} y_a \\ y_b \end{bmatrix},$$

where $y_a = [y_1, y_2]^T$ and $y_b = [y_3, y_4]^T$ are the distinct layers mapped to the first antenna panel 732 and the second antenna panel 734, respectively; $W_1$ and $W_2$ are the indicated precoders for transmissions to the first and second TRP; $z_1$ and $z_2$ are the precoded symbols to be transmitted from the antenna ports of the first antenna panel 732 and the second antenna panel 734, respectively.

By applying the two indicated precoders simultaneously on the different layers, the UE can transmit distinct data to the two TRPs at the same time in SDM scheme. This enhances the overall throughput compared to transmitting the same data in SFN scheme.

In general, for codebook-based UL transmission, for each modulation symbol i used for transmission of the PUSCH, the block of vectors $y(i) = [y^0(i), y^1(i), y^{v-1}(i)]^T$ represents the data for the set of v transmission layers $\{0, 1, \ldots, v-1\}$. i=0, 1, ..., M represents the index of the modulation symbol.

This block of layer data y(i) needs to be precoded (mapped) to the set of $\rho$ antenna ports $\{p_0, p_1, \ldots, p_{\rho-1}\}$ for transmission. The precoding is done by multiplying y(i) with a precoding matrix W as follows:

$$\begin{bmatrix} z^{p_0}(i) \\ \vdots \\ z^{p_{\rho-1}}(i) \end{bmatrix} = W \begin{bmatrix} y^0(i) \\ \vdots \\ y^{v-1}(i) \end{bmatrix},$$

where $z^{p_i}(i)$ is the precoded symbols for antenna port $p_j$ at modulation symbol i.

For SDM scheme with two TRPs, two precoders $W_1$ and $W_2$ need to be applied simultaneously as:

$$W = \begin{bmatrix} W_1 & 0 \\ 0 & W_2 \end{bmatrix},$$

where $W_1$ precodes data $y_1(i)$ for TRP 1 and $W_2$ precodes data $y_2(i)$ for TRP 2. This allows simultaneous transmission of different data to the two TRPs via the single PUSCH.

Figure 8:
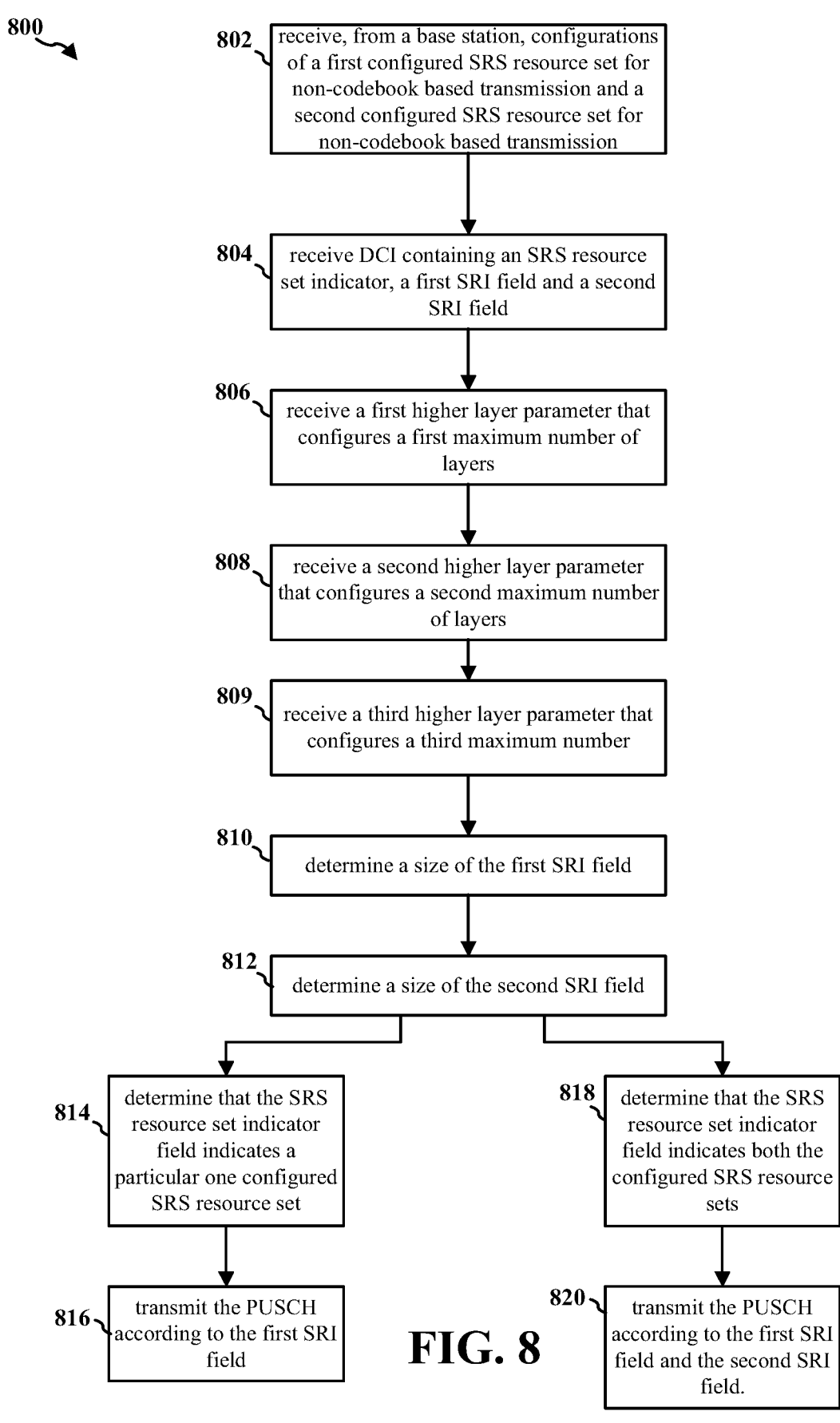
FIG. 8 is a flow chart of a method (process) for transmitting a PUSCH that is non-codebook based.

FIG. 8 is a flow chart 800 of a method (process) for transmitting a PUSCH that is non-codebook based. The method may be performed by a UE (e.g., the UE 704, the UE 250). In operation 802, the UE receives, from a base station, configurations of a first configured sounding reference signal (SRS) resource set for non-codebook based transmission and a second configured SRS resource set for non-codebook based transmission.

In operation 804, the UE receives downlink control information (DCI) containing an SRS resource set indicator, a first SRS resource indicator (SRI) field and a second SRI field. The first SRI field indicates an SRS resource of a first indicated SRS resource set and the second SRI field indicates an SRS resource of a second indicated SRS resource set.

In operation 806, the UE receives a first higher layer parameter that configures a first maximum number of layers. In operation 808, the UE receives a second higher layer parameter that configures a second maximum number of layers. In operation 809, the UE receives a third higher layer parameter that configures a third maximum number of layers.

In operation 810, the UE determines a size of the first SRI field based on the first maximum number of layers, the second maximum number of layers, the third maximum number of layers, a first number of SRS resources in the first indicated SRS resource set, and a second number of SRS resources in the second indicated SRS resource set. In operation 812, the UE determines a size of the second SRI field based on the third maximum number of layers and the second number of SRS resources in the second indicated SRS resource set.

In operation 814, the UE determines that the SRS resource set indicator field in the received DCI indicates that the first indicated SRS resource set is a particular one of a first configured SRS resource set and a second configured SRS resource set. In operation 816, the UE transmits a PUSCH scheduled by the received DCI according to the first SRI field based on the determination in operation 814.

Alternatively, in operation 818, the UE determines that the SRS resource set indicator field in the received DCI indicates that (a) the first indicated SRS resource set is the first configured SRS resource set and (b) the second indicated SRS resource set is the second configured SRS resource set. In operation 820, the UE transmits the PUSCH scheduled by the received DCI based on the first SRI field and the second SRI field according to an SRS resource set indicator field in the received DCI.

FIG. 9 is a flow chart 900 of a method (process) for transmitting a PUSCH that is codebook based. The method may be performed by a UE (e.g., the UE 704, the UE 250). In operation 902, the UE receives, from a base station, configurations of a first configured sounding reference signal (SRS) resource set for codebook based transmission and a second configured SRS resource set for codebook based transmission.

In operation 904, the UE receives downlink control information (DCI) containing an SRS resource set indicator, a first SRI field, a first transmission precoding matrix indicator (TPMI) field, a second SRI field, and a second TPMI field. The first SRI field indicates a first SRS resource of a first indicated SRS resource set. The first TPMI field indicates a first precoder associated with the first SRS resource to be used for transmitting a PUSCH scheduled by the received DCI. The second SRI field indicates a second SRS resource of a second indicated SRS resource set. The second TPMI field indicates a second precoder associated with the second SRS resource to be used for transmitting the PUSCH scheduled by the received DCI.

In operation 906, the UE receives a first higher layer parameter that configures a first maximum number of layers. In operation 908, the UE receives a second higher layer parameter that configures a second maximum number of layers. In operation 909, the UE receives a third second higher layer parameter that configures a third maximum number of layers.

In operation 910, the UE determines a size of the first SRI field based on a first number of configured SRS resources in the first indicated SRS resource set and a second number of configured SRS resources in the second indicated SRS resource set. The UE also determines a size of the first TPMI field based on the first maximum number of layers, the second maximum number of layers, the third maximum number of layers, a first number of configured SRS ports of the first SRS resource, and a second number of configured SRS ports of the second SRS resource.

In operation 912, the UE determines a size of the second SRI field based on the second number of configured SRS resources in the second indicated SRS resource set. The UE also determines a size of the second TPMI field based on the third maximum number of layers and the second number of configured SRS ports of the second SRS resource.

In operation 914, the UE determines that the SRS resource set indicator field in the received DCI indicates that the first indicated SRS resource set is a particular one of a first configured SRS resource set and a second configured SRS resource set. In operation 916, the UE transmits the PUSCH scheduled by the received DCI according to the first SRI field and the first TPMI field.

Alternatively, in operation 918, the UE determines that the SRS resource set indicator field in the received DCI indicates that (a) the first indicated SRS resource set is the first configured SRS resource set and (b) the second indicated SRS resource set is the second configured SRS resource set. In operation 920, the UE transmits the PUSCH scheduled by the received DCI according to the first SRI field, the first TPMI field, the second SRI field and the second TPMI field.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a base station, configurations of a first configured sounding reference signal (SRS) resource set for non-codebook based transmission and a second configured SRS resource set for non-codebook based transmission;

receiving a downlink control information (DCI) containing a first SRS resource indicator (SRI) field and a second SRI field, wherein the first SRI field indicates an SRS resource of a first indicated SRS resource set and the second SRI field indicates an SRS resource of a second indicated SRS resource set;

determining a size of the first SRI field based on a first maximum number of layers, a second maximum number of layers, a third maximum number of layers, a first number of SRS resources in the first indicated SRS resource set, and a second number of SRS resources in the second indicated SRS resource set;

determining a size of the second SRI field based on the third maximum number of layers and the second number of SRS resources in the second indicated SRS resource set; and transmitting a physical uplink shared channel (PUSCH) scheduled by the received DCI based on the first SRI field and the second SRI field according to an SRS resource set indicator field in the received DCI.

2. The method of claim 1, further comprising:

receiving a first higher layer parameter that configures the first maximum number of layers;

receiving a second higher layer parameter that configures the second maximum number of layers; and receiving a third higher layer parameter that configures the third maximum number of layers.

3. The method of claim 1, further comprising:

determining that an SRS resource set indicator field in the received DCI indicates that the first indicated SRS resource set is a particular one of the first configured SRS resource set and the second configured SRS resource set.

4. The method of claim 3, further comprising:

transmitting the PUSCH scheduled by the received DCI according to the first SRI field.

5. The method of claim 1, further comprising:

determining that an SRS resource set indicator field in the received DCI indicates that (a) the first indicated SRS resource set is the first configured SRS resource set and (b) the second indicated SRS resource set is the second configured SRS resource set.

6. The method of claim 5, further comprising:

transmitting the PUSCH scheduled by the received DCI according to the first SRI field and the second SRI field.

7. A method of wireless communication of a user equipment (UE), comprising:

receiving, from a base station, configurations of a first configured sounding reference signal (SRS) resource set for codebook based transmission and a second configured SRS resource set for codebook based transmission;

receiving a downlink control information (DCI) containing a first SRI field, a first transmission precoding matrix indicator (TPMI) field, a second SRI field, and a second TPMI field, wherein the first SRI field indicates a first SRS resource of a first indicated SRS resource set, the first TPMI field indicates a first precoder associated with the first SRS resource to be used for transmitting a PUSCH scheduled by the received DCI, the second SRI field indicates a second SRS resource of a second indicated SRS resource set, the second TPMI field indicates a second precoder associated with the second SRS resource to be used for transmitting the PUSCH scheduled by the received DCI;

determining a size of the first SRI field based on a first number of configured SRS resources in the first indicated SRS resource set and a second number of configured SRS resources in the second indicated SRS resource set;

determining a size of the second SRI field based on the second number of configured SRS resources in the second indicated SRS resource set;

determining a size of the first TPMI field based on a first maximum number of layers, a second maximum number of layers, a third maximum number of layers, a first number of configured SRS ports of the first SRS resource and a second number of configured SRS ports of the second SRS resource;

determining a size of the second TPMI field based on the third maximum number of layers and the second number of configured SRS ports of the second SRS resource; and transmitting the PUSCH scheduled by the received DCI based on the first SRI field, the first TPMI field, the second SRI field and the second TPMI field according to an SRS resource set indicator field in the received DCI.

8. The method of claim 7, further comprising:

receiving a first higher layer parameter that configures the first maximum number of layers;

receiving a second higher layer parameter that configures the second maximum number of layers;

receiving a third higher layer parameter that configures the third maximum number of layers.

9. The method of claim 7, further comprising:

determining that the SRS resource set indicator field indicates that the first indicated SRS resource set is a particular one of the first configured SRS resource set and the second configured SRS resource set.

10. The method of claim 9, further comprising:

transmitting the PUSCH scheduled by the received DCI according to the first SRI field and the first TPMI field.

11. The method of claim 7, further comprising:

determining that the SRS resource set indicator field indicates that (a) the first indicated SRS resource set is the first configured SRS resource set and (b) the second indicated SRS resource set is the second configured SRS resource set.

12. The method of claim 11, further comprising:

transmitting the PUSCH scheduled by the received DCI according to (a) the first SRI field and the first TPMI field as well as (b) the second SRI field and the second TPMI field.

13. An apparatus for wireless communication, the apparatus being a user equipment (UE), comprising:

a memory; and at least one processor coupled to the memory and configured to:

receive, from a base station, configurations of a first configured sounding reference signal (SRS) resource set for non-codebook based transmission and a second configured SRS resource set for non-codebook based transmission;

receive a downlink control information (DCI) containing a first SRS resource indicator (SRI) field and a second SRI field, wherein the first SRI field indicates an SRS resource of a first indicated SRS resource set and the second SRI field indicates an SRS resource of a second indicated SRS resource set;

determine a size of the first SRI field based on a first maximum number of layers, a second maximum number of layers, a third maximum number of layers, a first number of SRS resources in the first indicated SRS resource set, and a second number of SRS resources in the second indicated SRS resource set;

determine a size of the second SRI field based on the third maximum number of layers and the second number of SRS resources in the second indicated SRS resource set; and transmit a PUSCH scheduled by the received DCI based on the first SRI field and the second SRI field according to an SRS resource set indicator field in the received DCI.

14. The apparatus of claim 13, wherein the at least one processor is further configured to:

receive a first higher layer parameter that configures the first maximum number of layers;

receive a second higher layer parameter that configures the second maximum number of layers; and receive a third higher layer parameter that configures the third maximum number of layers.

15. The apparatus of claim 13, wherein the at least one processor is further configured to:

determine that an SRS resource set indicator field in the received DCI indicates that the first indicated SRS resource set is one of the first configured SRS resource set and the second configured SRS resource set.

16. The apparatus of claim 15, wherein the at least one processor is further configured to:

transmit the PUSCH scheduled by the received DCI according to the first SRI field.

17. The apparatus of claim 13, wherein the at least one processor is further configured to:

determine that an SRS resource set indicator field in the received DCI indicates that (a) the first indicated SRS resource set is the first configured SRS resource set and (b) the second indicated SRS resource set is the second configured SRS resource set.

18. The apparatus of claim 17, wherein the at least one processor is further configured to:

transmit the PUSCH scheduled by the received DCI according to the first SRI field and the second SRI field.

* * * * *